United States Patent [19]

Marchant

[11] 3,933,635

[45] Jan. 20, 1976

[54] METHOD FOR REMOVING SOLUBLE SELENIUM FROM ACIDIC WASTE WATER

[75] Inventor: Wayne N. Marchant, Salt Lake City, Utah

[73] Assignee: The United States of America as represented by the Secretary of the Interior, Washington, D.C.

[22] Filed: July 15, 1975

[21] Appl. No.: 596,117

[52] U.S. Cl. .................... 210/50; 423/510; 75/121
[51] Int. Cl.² ........................................ C02C 5/02
[58] Field of Search .......... 75/121; 210/50; 423/510

[56] References Cited
UNITED STATES PATENTS

| | | | |
|---|---|---|---|
| 2,889,206 | 6/1959 | Hobin | 423/510 |
| 2,930,678 | 3/1960 | Oberbacher et al. | 423/510 |
| 3,130,012 | 4/1964 | Prater et al. | 423/510 |
| 3,433,596 | 3/1969 | Wagenmann et al. | 423/510 |
| 3,575,853 | 4/1971 | Gaughan et al. | 210/50 |

*Primary Examiner*—Thomas G. Wyse
*Attorney, Agent, or Firm*—William S. Brown; Donald R. Fraser

[57] ABSTRACT

Selenium is removed from solution in acidic waste water by treatment of the water with a metallic reducing agent. The invention is particularly effective for removal of selenium from zinc smelter effluent by reaction of the effluent with powdered zinc.

4 Claims, No Drawings

METHOD FOR REMOVING SOLUBLE SELENIUM FROM ACIDIC WASTE WATER

A large percentage of zinc is obtained industrially from sulfide ores such as sphalerite, ZnS. The ores are initially concentrated to remove gangue and other metals such as lead, iron, and copper. The concentrates are then smelter-roasted to convert the zinc sulfide to oxide according to the equation:

$$2ZnS + 3O_2 \rightarrow 2ZnO + 2SO_2$$

Offgases from the smelter operation are water-scrubbed for cooling, humidification and removal of particulates. In the scrubbing process $SO_2$ and other soluble materials are absorbed by the scrubber water. When the concentrate contains selenium, typically in concentrations of about 0.1% to 1%, the scrub solution will also contain selenium in the form of selenious acid, $H_2SeO_3$, and generally in concentrations of about 5 to 30 ppm. Typically, these solutions also contain $SO_2$ in concentrations of about 0.3 to 2 grams per liter, and have pH values of about 2.1 to 2.6.

This scrub solution, which constitutes effluent from the smelter operation, contains concentrations of selenium that are too high to meet regulations pertaining to the quality of water acceptable for discharge into public waterways. Accordingly, removal of a substantial proportion of the selenium from the effluent is essential.

Commonly employed water treatment operations, such as lime coagulation and sand filtration, are not sufficiently effective for removal of selenium from solution. Ion exchange processes are more effective, but are complex and, therefore, expensive.

It has now been found, according to the method of the invention, that an effective, rapid and economical removal of selenium from acidic waste water solutions may be achieved by treatment of such solutions with a metallic reducing agent. The method of the invention is particularly applicable to removal of selenium from zinc smelter effluent by treatment of the effluent with metallic zinc. However, it may also be employed for removal of selenium from other aqueous wastes such as those from copper refining processes, scrubber solutions from coal burning operations, etc. In addition, other metallic reducing agents such as iron or aluminum may be used.

The metallic reducing agent is usually most efficient when employed in a finely divided form, preferably in the form of a powder of a particle size of about 50 to 150 microns. However, other forms of the metal such as scrap fragments, granules, turnings, wools, etc. may be appropriate in specific situations. The optimum amount of the reducing agent used will generally be approximately the stoichiometric amount required to precipitate substantially all of the selenium from solution. In the case of the preferred embodiment of the invention, i.e., the use of zinc powder to precipitate selenium from zinc smelter effluent, the reaction involved is essentially as follows:

$$H_2SeO_3 + 4H^+ + 2Zn^\circ \rightarrow Se^\circ + 2Zn^{++} + 3H_2O.$$

Somewhat greater or lesser amounts of metallic reducing agent may, however, be suitable, depending on the desired degree of removal of the selenium. Generally, agitation, e.g., vigorous stirring, of the admixture of waste water and reducing agent is also desirable for optimum efficiency of the reaction.

Optimum temperature and pH for precipitation of selenium by the method of the invention will vary considerably depending on the specific waste water treated and the reducing agent employed. Generally, however, a temperature of about 25° to 85° C and a pH of about 1 to 4 is suitable. The waste water may be treated to achieve these values, or they may be inherent in the specific waste water, e.g., in zinc smelter effluent which will generally be at a temperature of about 50° to 70° C and a pH of about 2 to 3.

Optimum time for the reaction of the invention will also vary greatly with the type of waste water, type and state of subdivision of the metallic reducing agent, temperature, pH, etc., and is best determined empirically. Generally, however, a time of about 1 to 10 minutes is sufficient for maximum precipitation of the selenium. The reaction is often sufficiently rapid to permit the use of a continuous process. Following completion of the reaction, precipitated solids, consisting predominantly of selenium and any unreacted reducing agent, may be separated from the remaining solution by any conventional means such as filtration, decanting, etc. Reduction in the selenium content of the solution will generally be found to be at least about 60 to greater than 98 percent.

The method of the invention will be more specifically illustrated by the following examples:

EXAMPLE 1

Process waste water (3 liters; pH 2.4, containing 7.6 ppm selenium), which contained some finely divided solid as received from a zinc smelter, was heated to 70° C to simulate the conditions prevailing at the smelter. To the vigorously stirred solution was added 0.150 gram of reagent grade zinc dust. The solution was stirred continuously with heating to maintain the temperature at 70° C. Samples were withdrawn at intervals and filtered to separate the soluble selenium from the solids in the system. Selenium determinations were performed on the filtrates and the results are shown in Table I.

TABLE 1

| Elapsed time, min | Selenium concentration in filtrate, ppm | Selenium removed, pct |
|---|---|---|
| 0 (control sample) | 7.6 | 0 |
| 0.5 | 5.4 | 29 |
| 1.0 | 2.2 | 71 |
| 2.5 | 0.2 | 97 |
| 4.0 | <0.2[1] | >97 |

[1]The threshold of detection in the analysis used was 0.2 ppm.

EXAMPLE 2

A two-stage cocurrent reactor for continuous zinc treatment of process water was assembled as follows: A 1-liter glass beaker fitted with a glass sidearm which permitted overflow of solution when the volume exceeds 800 milliliter (stage 1) was positioned to overflow by gravity into a second such beaker (stage 2) which overflowed to a storage vessel. Both stages were equipped with four plastic baffles and overhead stirrers fitted with paddletype impellers. Zinc dust was fed continuously into stage 1. Process waste water containing 7.8 ppm Se was preheated to 70° C and pumped into stage 1 at a rate of 330 milliliters per minute. Zinc dust was added simultaneously to stage 1 at a rate of 0.07 gram per minute. After a total of 9.9 liters of water had been pumped through the apparatus (to allow attainment of steady-state conditions) samples were taken from both stages, filtered to remove interfering solids, and analyzed for selenium. The concentration of soluble selenium in both stages was below 0.2 ppm (the threshold of detection) for a removal of at least 97 percent of the selenium present in the feed solution.

EXAMPLE 3

In this example, other metallic reducing agents were compared with zinc dust in a standardized test routine. Process water (0.5 liter usually; 3.0 liters when bulky reagents such as aluminum or iron scrap were used) was heated to and maintained at 70° C. The solid reagent was added to the vigorously stirred solution. After 20 minutes, a sample was withdrawn, filtered to remove interfering solids, and analyzed for soluble selenium. Results are shown in Table 2.

TABLE 2

| Metal used and physical form | Application rate, g/l | Selenium concentration before treatment, ppm | Selenium concentration after treatment, ppm | Selenium removed, pct |
|---|---|---|---|---|
| zinc dust | 0.12 | 6.2 | 0.3 | 94 |
| do. | .15 | 6.2 | .1 | 98 |
| do. | .20 | 6.3 | <0.1 | >98 |
| Iron powder; 100 mesh | .10 | 6.6 | 1.9 | 71 |
| Iron powder; 100 mesh | .20 | 6.6 | .6 | 91 |
| Detinned can scrap; ⅛in. by 1 in. pieces | 2.0 | 3.1 | .2 | 94 |
| Aluminum powder | .2 | 6.3 | .1 | 98 |
| Aluminum can scrap; ~⅛in. by ~1 in. pieces | 2.0 | 5.5 | .2 | 96 |

I claim:

1. A method for removing selenium from zinc smelter effluent comprising reacting the effluent with a metallic reducing agent at a temperature of about 25° to 85° C for a time sufficient to reduce a substantial portion of the soluble selenium to insoluble metallic selenium.

2. The method of claim 1 which the reaction temperature is about 50° to 70° C.

3. The method of claim 1 in which the reducing agent is zinc.

4. The method of claim 3 in which the zinc is in powder form.

* * * * *